US012361064B2

United States Patent
Palazzo et al.

(10) Patent No.: US 12,361,064 B2
(45) Date of Patent: *Jul. 15, 2025

(54) SYSTEMS AND METHODS FOR XBRL TAG OUTLIER DETECTION

(71) Applicant: WORKIVA INC., Ames, IA (US)

(72) Inventors: David Palazzo, Littleton, CO (US); Vasily Korf, Berlin (DE); Lisa Teofilo, Raleigh, NC (US); Tristan Vellinga, Arvada, CO (US); Dorette Vermeulen, Renton, WA (US)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,692

(22) Filed: Nov. 29, 2023

(65) Prior Publication Data

US 2024/0211513 A1 Jun. 27, 2024

Related U.S. Application Data

(63) Continuation of application No. 18/089,223, filed on Dec. 27, 2022, now Pat. No. 11,868,400.

(51) Int. Cl.
*G06F 7/00* (2006.01)
*G06F 16/84* (2019.01)
*G06N 20/00* (2019.01)

(52) U.S. Cl.
CPC ............ *G06F 16/84* (2019.01); *G06N 20/00* (2019.01)

(58) Field of Classification Search
CPC ........ G06F 16/84; G06F 16/80; G06F 16/219; G06F 16/83; G06F 16/3329; G06F 16/334; G06F 16/3344; G06F 40/279; G06F 40/14; G06F 40/226; G06F 40/117; G06F 40/143; G06N 20/00
See application file for complete search history.

(56) References Cited

U.S. PATENT DOCUMENTS

| | | | |
|---|---|---|---|
| 8,601,367 B1 * | 12/2013 | Ritz | G06Q 40/00 |
| | | | 715/234 |
| 9,348,854 B1 * | 5/2016 | Haila | G06F 40/154 |
| 11,087,070 B1 * | 8/2021 | Goodman | G06F 40/14 |
| 2009/0006472 A1 * | 1/2009 | Bush | G06F 40/169 |
| 2013/0117268 A1 * | 5/2013 | Smith | G06F 40/18 |
| | | | 707/739 |

OTHER PUBLICATIONS

PCT Search Report and Written Opinion issued in related application PCT/US2023/085916, Feb. 15, 2024, 8 pages.

* cited by examiner

*Primary Examiner* — Mohammad A Sana
(74) *Attorney, Agent, or Firm* — Faegre Drinker Biddle & Reath LLP

(57) ABSTRACT

Disclosed are systems and methods for XBRL tag outlier detection. In some embodiments, the method includes the steps of: receiving a first set of XBRL data records; generating a second set of XBRL data records based upon a subset of the first set of XBRL data records; training a machine learning model using the first set of XBRL data records and the second set of XBRL data records; receiving an XBRL document associated with one or more assigned XBRL tags; and analyzing the XBRL document using the trained machine learning model to identify a set of outlier XBRL tags in the one or more assigned XBRL tags.

21 Claims, 5 Drawing Sheets

SYSTEMS AND METHODS FOR XBRL TAG OUTLIER DETECTION

CROSS-REFERENCE TO RELATED APPLICATIONS

This application is a continuation of U.S. patent application Ser. No. 18/089,223, filed on Dec. 27, 2022, the disclosure of which is hereby incorporated by reference in its entirety.

TECHNICAL FIELD

The present disclosure relates to reporting of business data in documents using the XBRL (extensible Business Reporting Language), and more particularly to systems and methods for automatically detecting XBRL document tag outliers (e.g., tag anomalies).

BACKGROUND

XBRL is a standardized computer language by which businesses may efficiently and accurately communicate business data with each other and with regulating agencies. Extensible Business Reporting Language (XBRL) 2.1 is available at http://www.xbrl.org/Specification/XBRL-2.1/REC-2003-12-31/XBRL-2.1-REC-2003-12-31+corrected-errata-2013-02-20.html. XBRL is a markup language not too dissimilar from XML (extensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

Taxonomies are the report and subject specific dictionaries used by the XBRL community. Taxonomies include specific tags, referred to as XBRL tags, which are used for individual items of data (e.g., "Revenues", "Operating expenses"), their attributes and their interrelationships. Different taxonomies are often required for different business reporting purposes.

XBRL is bringing about a dramatic change in the way people think about exchanging business information. Financial disclosures are a prime example of an industry built around a paper-based process that is being pushed into the technological age. This transition involves a paradigm shift from the pixel perfect world of building unstructured reports to a digital world where structured data is dominant.

SUMMARY

Disclosed are systems and methods for XBRL tag outlier detection. At least some aspects of the present disclosure are directed to a method implemented by a computer system having one or more processors and one or more memories. The method comprises: receiving a first set of XBRL data records; generating a second set of XBRL data records based upon a subset of the first set of XBRL data records; training a machine learning model using the first set of XBRL data records and the second set of XBRL data records; receiving an XBRL document associated with one or more assigned XBRL tags; and analyzing the XBRL document using the trained machine learning model to identify a set of outlier XBRL tags in the one or more assigned XBRL tags, each outlier XBRL tag in the set of identified outlier XBRL tags being an uncommon tag for corresponding filing information.

At least some aspects of the present disclosure are directed to a method implemented by a computer system having one or more processors and one or more memories, comprising: receiving a filing package including an XBRL document with one or more assigned XBRL tags; analyzing the filing package to determine a classification identifier; selecting a trained machine learning model from a plurality of machine learning models based on the classification identifier; analyzing the XBRL document and the one or more assigned XBRL tags using the selected trained machine learning model; identifying a set of outlier XBRL tags in the one or more assigned XBRL tags, each outlier XBRL tag in the set of identified outlier XBRL tags being an uncommon tag for corresponding filing information in the filing package.

BRIEF DESCRIPTION OF THE DRAWINGS

The accompanying drawings are incorporated in and constitute a part of this specification and, together with the description, explain the features and principles of the disclosed embodiments. In the drawings.

DETAILED DESCRIPTION

Figure 1:
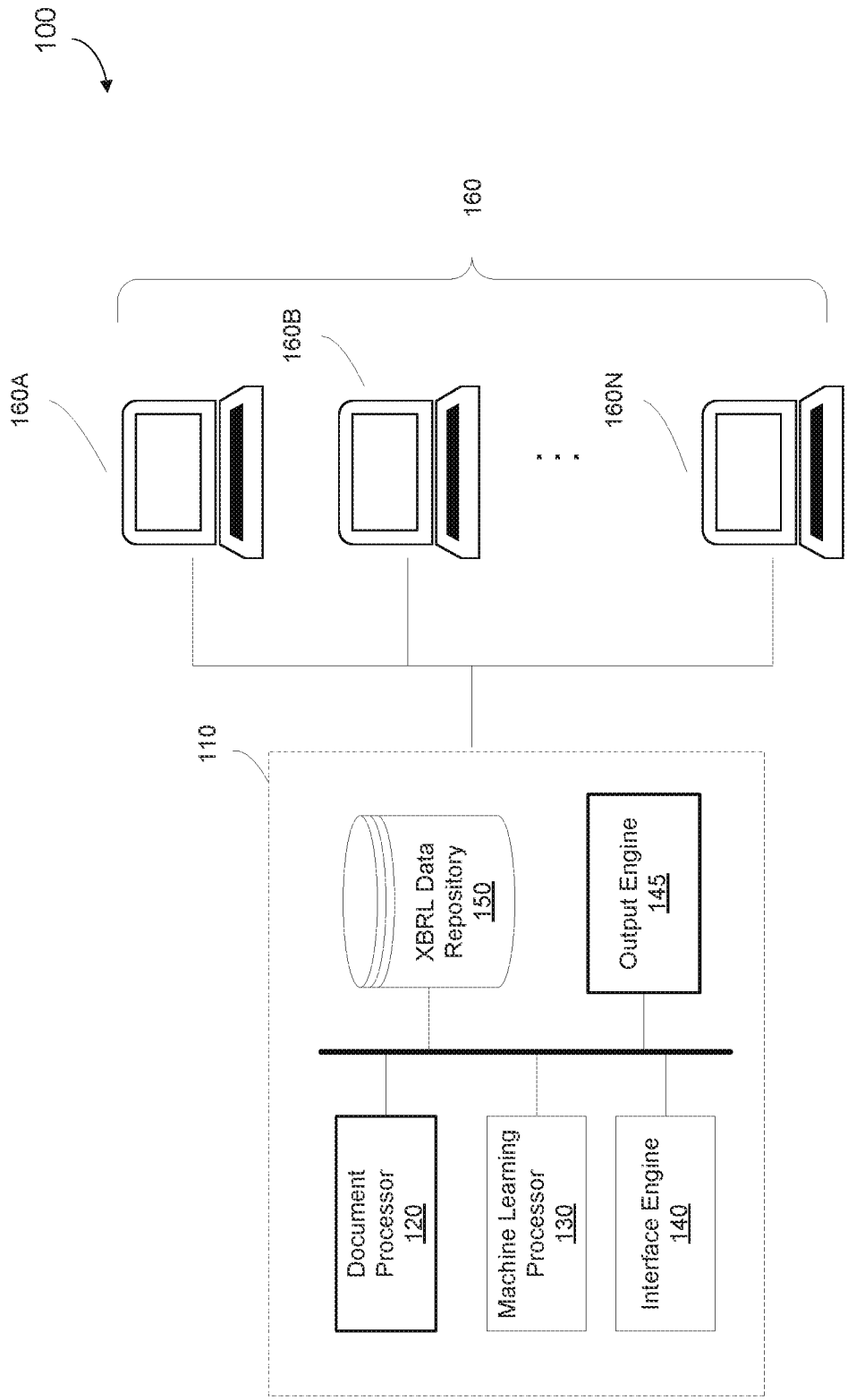
FIG. 1 depicts an illustrative system diagram of an XBRL tag outlier detection system, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input.

For example, predicting an outcome based on a particular piece of information may additionally, or alternatively, base the same determination on another piece of information.

One of the ongoing challenges faced by those preparing financial statements or other business reports with XBRL is using the correct XBRL tags among thousands of XBRL tags. At least some embodiments of the present disclosure are directed to systems and methods for XBRL tag outlier detection using one or more trained machine learning models. As used herein, an outlier XBRL tag, or referred to as an XBRL tag anomaly, refers to an uncommon XBRL tag for corresponding filing information. In certain embodiments, the XBRL tags vary in different taxonomies. For example, an XBRL tag is an outlier XBRL tag for certain filing information for one taxonomy and the XBRL tag is not an outlier XBRL tag for the same filing information for another taxonomy. In some embodiments, the XBRL tag outlier detection system selects a trained machine learning model from a plurality of trained machine learning models based upon a classification identifier, for example, a SIC ("Standard Industry Classification") code, an industry identifier.

At least certain embodiments of the present disclosure are directed to systems and methods for training machine learning models, for example, to improve the machine learning models for detecting outlier tags. In some embodiments, the XBRL tag outlier detection system generates a second set of XBRL data records based on a first set of XBRL data records. As used herein, an XBRL training data record includes one or more XBRL tags, and includes a classification identifier, a root abstract, an XBRL outline, a document location for a corresponding XBRL tag, and/or the like. In some examples, the system modifies an XBRL tag in an XBRL data record in the first set of XBRL data records to generate the XBRL data record in the second set of XBRL data records. In certain examples, the system modifies filing information (e.g., the document location, the associated filing data) in an XBRL data record in the first set of XBRL data records to generate the XBRL data record in the second set of XBRL data records. In certain embodiments, the second set of XBRL data records include outlier XBRL tags.

FIG. 1 depicts an illustrative system diagram of an XBRL tag outlier detection environment 100, in accordance with certain embodiments of the present disclosure. In some embodiments, as illustrated, the XBRL tag outlier detection environment 100 includes an XBRL tag outlier detection system 110 and one or more user devices 160 (e.g., user device 160A, user device 160B, . . . user device 160N). In certain embodiments, the XBRL tag outlier detection system 110 includes a document processor 120, a machine learning processor 130, an interface engine 140, an output engine 145, and an XBRL data repository 150. One or more components in the environment 100 are optional. In some embodiments, the environment 100 can include additional components. In certain embodiments, the system 110 interfaces with one or more other devices or systems 160, for example, a filing system, a finance system, a vendor system, and/or the like.

Figure 4:
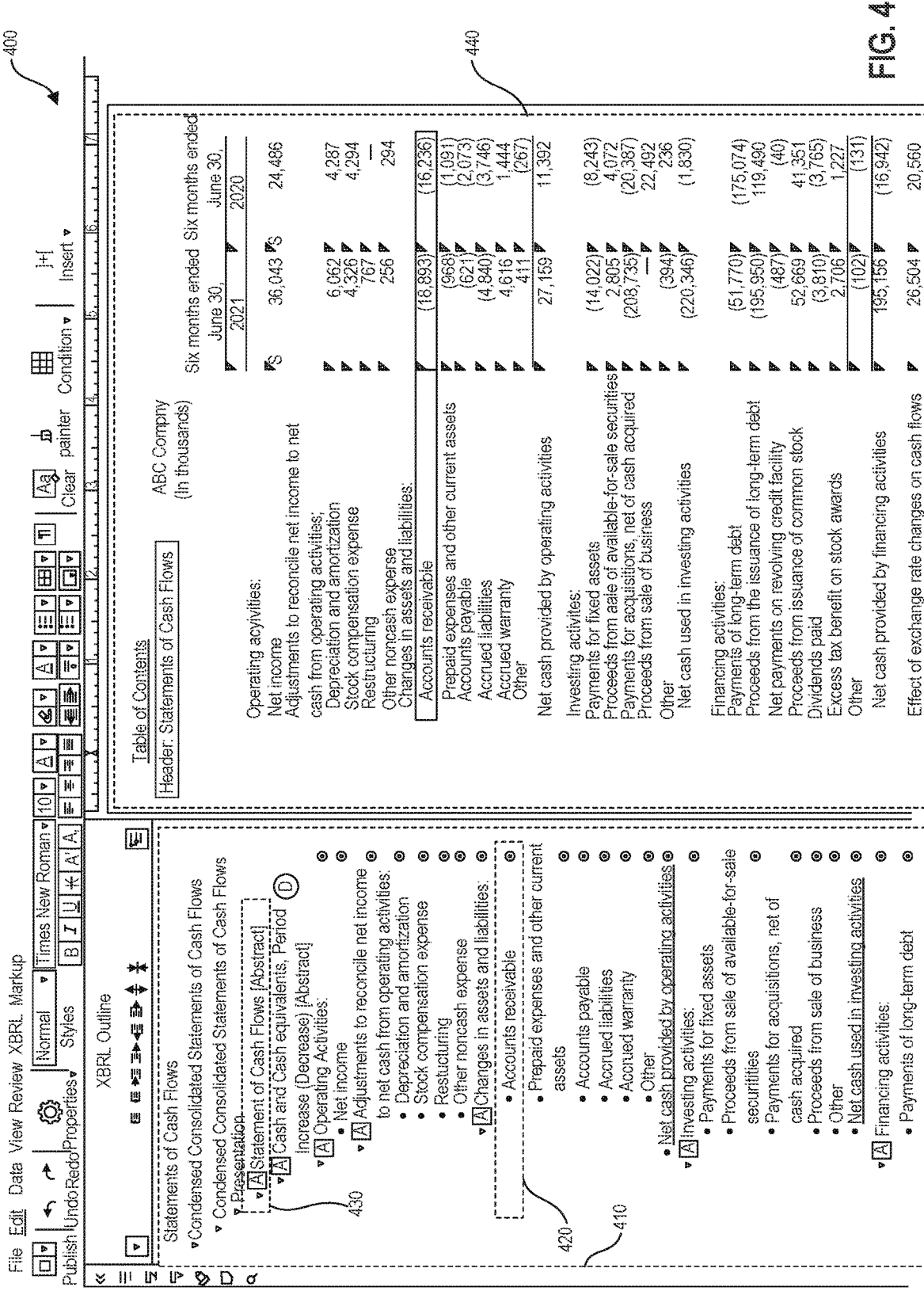
FIG. 4 illustrates one example of an XBRL package.

According to certain embodiments, the document processor 120 and/or the XBRL tag outlier detection system 110 is configured to receive a filing package (e.g., receive via the interface engine 140, retrieve from the XBRL data repository 150) including one or more documents, where one of the one or more documents is an XBRL document including one or more XBRL tags. As used herein, an XBRL document refers to a document being tagged with one or more XBRL tags. In some embodiments, the filing package includes a file containing an XBRL outline, also referred to as a presentation section outline. One example of an XBRL outline is illustrated in FIG. 4. In certain embodiments, the XBRL tag outlier detection system 110 and/or the document processor 120 generates or extracts the XBRL outline based on the filing package and/or the XBRL document. In certain embodiments, the document can be a business document, a reporting document, a compliance document, and/or the like. In some cases, the system can receive the document via interfacing with other systems. In some cases, the system can receive the document via retrieving the document via a data repository (e.g., the XBRL data repository 150). In some embodiments, the XBRL tag outlier detection system is coupled to an electronic filing system via a software interface to receive the document. In some embodiments, the system is configured to use a set of predetermined protocols through the software interface. In certain embodiments, the software interface comprises an application programming interface and/or a web service interface.

In some embodiments, the document processor 120 includes natural language processing functionalities. In some cases, the document processor 120 parses the received documents into n-grams and generates a plurality of terms based on the n-grams. As used herein, n-gram refers to a contiguous sequence of n words including numbers and symbols from a data stream, which typically is a phrase or a sequence of words with meaning. N-grams can include numbers and symbols, such as a comma, a period, a dollar sign, and/or the like. In some cases, the document processor 120 normalizes the parsed n-grams. Further, in some cases, the document processor 120 generates a plurality of normalized sections having normalized terms based on the n-grams. In one example, the plurality of intake terms includes normalized n-grams. As one example, the n-gram is a date and the normalized term is the date in a predefined format (e.g., year-month-date). In some cases, the document processor 120 determines context of the normalized terms. In one example, the context is a part of the same sentence of the normalized terms. In one example, the document processor 120 parses the n-grams and labels the n-grams based on the context, for example, period, expense, revenue, etc. In some embodiments, a document processor 120 uses a natural language model for processing the document and parsed n-grams. For example, a natural language model can be a statistical language model, a neural network language model, and/or the like.

In some embodiments, the machine learning processor 130 is configured to train one or more machine learning models using XBRL data records. In certain embodiments, the machine learning models may include any suitable machine learning models, deep learning models, and/or the like. In some embodiments, the machine learning models include at least one of a decision tree, a random forest, a support vector machine, a neural network, a convolutional neural network, a recurrent neural network, and/or the like. In certain embodiments, the machine learning models include a meta-classifier that generates classifications based on outputs of two or more machine learning models.

According to some embodiments, the XBRL tag outlier detection system 110 receives a first set of XBRL data records. In some examples, the first set of XBRL data records are selected based on a taxonomy (e.g., a domain taxonomy). In certain embodiments, each XBRL data record in the first set of XBRL data records includes one or more XBRL tags and at least one selected from a group consisting of, a classification identifier, a root abstract, and an XBRL outline. In some embodiments, each XBRL data record in the first set of XBRL data records include one or more XBRL tags, a classification identifier, a root abstract, and/or an XBRL outline. In certain examples, at least a part of the first set of XBRL data records include one or more XBRL tags (e.g., XBRL concepts). FIG. 4 illustrates one example of an XBRL package 400 including an XBRL outline 410, a selected XBRL section location 420, a root abstract 430, and filing information 440. In some examples, the classification identifier includes the filer CIK, the filer SIC, a CIK group identifier, a SIC group identifier, an industry sector identifier, a filer identifier, and/or the like. In certain embodiments, the classification identifier is extracted from the filing information. In some embodiments, the XBRL outline is extracted from a filing package and stored with the XBRL data record.

According to certain embodiments, the XBRL tag outlier detection system 110 and/or the machine learning processor 130 selects a subset of the first set of XBRL data records. In some embodiments, the subset of the first set of XBRL data records is selected based upon one or more criteria. In certain embodiments, the subset of the first set of XBRL data records is selected based upon one or more predetermined criteria. In some embodiments, the subset of the first set of XBRL data records is selected based upon one or more criteria that are dynamically changed, for example, during the training process. In certain embodiments, the subset of the first set of XBRL data records is randomly selected.

According to some embodiments, the XBRL tag outlier detection system 110 and/or the machine learning processor 130 is configured to change at least a part of or all of the subset of the first set of XBRL data records. In certain embodiments, the XBRL tag outlier detection system 110 and/or the machine learning processor 130 is configured to change the XBRL tag in a data record in the subset of the first set of XBRL data records. In some embodiments, the XBRL tag outlier detection system 110 and/or the machine learning processor 130 is configured to change the filing information in a data record in the subset of the first set of XBRL data records. In certain embodiments, the XBRL tag outlier detection system 110 and/or the machine learning processor 130 is configured to change the XBRL outline in a data record in the subset of the first set of XBRL data records.

According to certain embodiments, the XBRL tag outlier detection system 110 and/or the machine learning processor 130 is configured to generate a second set of XBRL data records based on the modified data records in the subset of the first set of data records. In some embodiments, the XBRL tag outlier detection system 110 and/or the machine learning processor 130 modifies the first XBRL tag in the first record in the subset of the first set of XBRL data records to generate a second record in the second set of XBRL data records, where the first record includes first filing information and the first XBRL tag, the second record includes a second XBRL tag and the first filing information, and the second XBRL tag is the modified first XBRL tag. In certain embodiments, the second XBRL tag is an outlier tag based at least upon a taxonomy and the first filing information. In some embodiments, the taxonomy is determined or selected based at least in part upon the classification identifier.

In certain embodiments, the XBRL tag outlier detection system 110 and/or the machine learning processor 130 modifies the third filing information in a third record in the subset of the first set of XBRL data records to generate a fourth record in the second set of XBRL data records, where the third record includes a third XBRL tag and the third filing information, the fourth record includes a fourth XBRL tag and the fourth filing information, the fourth XBRL tag is the same as the third XBRL tag, and the fourth filing information is the modified third filing information. In some embodiments, the fourth XBRL tag is an outlier tag based at least upon a taxonomy and the fourth filing information.

In certain embodiments, the XBRL tag outlier detection system 110 and/or the machine learning processor 130 modifies a fifth XBRL outline in a fifth record in the subset of the first set of XBRL data records to generate a sixth record in the second set of XBRL data records, where the fifth record includes a fifth XBRL tag and fifth filing information, the fifth filing information includes the fifth XBRL outline, the sixth record includes a sixth XBRL tag and sixth filing information, the sixth XBRL tag is the same as the fifth XBRL tag, and the sixth filing information includes the modified fifth XBRL outline. In some embodiments, the sixth XBRL tag is an outlier tag based at least upon a taxonomy and the sixth filing information.

According to some embodiments, the XBRL tag outlier detection system 110 and/or the machine learning processor 130 is configured to train a machine learning model using the first set of the XBRL data records and the second set of the XBRL data records. In certain embodiments, the system is configured to train different machine learning models using different sets of XBRL data records. According to certain embodiments, at process 355, the XBRL tag outlier detection system is configured to validate the trained machine learning model using a third set of XBRL data records. In some embodiments, the third set of XBRL data records and the first set of the XBRL data records do not have any overlapping data records. In another embodiment, the third set of XBRL data records and the first set of the XBRL data records have at least one overlapping data record.

According to some embodiments, the XBRL tag outlier detection system 110 and/or the machine learning processor 130 is configured to check whether the training criteria is met. In certain embodiments, the training criteria includes a loss function to calculate the efficacy of the trained machine model. In some embodiments, the training criterion is related to repeated failure to reduce loss on the validation subset (e.g., the third set of XBRL data records). For example, the training criterion is when the training fails to improve the efficacy of the machine learning model by a predetermined number of epochs. In some embodiments, the training criterion is related to the efficacy of the machine learning model equal to or higher than a predetermined threshold (e.g., 95%). In certain embodiments, if the training criterion is not met, the XBRL tag outlier detection system 110 and/or the machine learning processor 130 configured to modify one or more parameters for the trained machine learning models, and go back to the training process. In some embodiments, if the training criterion is met, the training process is ended.

In some embodiments, the XBRL tag outlier detection system 110 and/or the machine learning processor 130 is configured to train different machine learning models with different classification identifiers using different sets of XBRL data records. In certain embodiments, the XBRL tag outlier detection system 110 and/or the machine learning processor 130 is configured to select a first XBRL dataset based upon a first classification identifier, modify a subset of first XBRL dataset, and train a first machine learning model using the first XBRL dataset. In some embodiments, the system is configured to select a second XBRL dataset based upon a second classification identifier, modify a subset of the second XBRL dataset, and train a second machine learning model using the second XBRL dataset including the modified subset, where the second machine learning model is different from the first machine learning model.

According to certain embodiments, the XBRL tag outlier detection system 110 and/or the machine learning processor 130 is configured to analyze the filing package and/or the XBRL document to determine a classification identifier. In some embodiments, the classification identifier can be an identifier of the filer associated with the filing package, the filer CIK ("Central Index Key"), the filer SIC, a SIC group, a CIK group, and/or the like.

According to some embodiments, the XBRL tag outlier detection system 110 and/or the machine learning processor 130 selects a trained machine learning model from a plurality of machine learning models based at least in part on the classification identifier. In some embodiments, the XBRL tag outlier detection system 110 and/or the machine learning processor 130 are configured to select a first machine learning model based on a first classification identifier and select a second machine learning model based on a second classification identifier different from the first classification identifier, where the second machine learning model is different from the first machine learning model. In certain examples, the XBRL tag outlier detection system 110 and/or the machine learning processor 130 is configured to select a first machine learning model based on a first CIK and select a second machine learning model based on a second CIK different from the first CIK, where the second machine learning model is different from the first machine learning model. In some examples, the system is configured to select a first machine learning model based on a first SIC and select a second machine learning model based on a second SIC different from the first SIC, where the second machine learning model is different from the first machine learning model. In certain examples, the XBRL tag outlier detection system 110 and/or the machine learning processor 130 is configured to select a first machine learning model based on a first CIK and SIC combination and select a second machine learning model based on a second CIK and SIC combination different from the first CIK and SIC combination, where the second machine learning model is different from the first machine learning model.

In some embodiments, the XBRL tag outlier detection system 110 and/or the machine learning processor 130 identifies tagging sections in the document, for example, based on the XBRL outline. In one embodiment, the tagging sections are identified based on a known document format. In one embodiment, the XBRL tag outlier detection system 110 and/or the machine learning processor 130 can extract and aggregate from the tagging sections potentially relevant XBRL metadata, tags, and relationships including, for example, tagged concept, concept value, numeric scale, units of measure, unit numerators, unit denominators, row headers (e.g., html row headers), column headers, document type, filer category, sibling and parent tags, accession number, filing date, XBRL taxonomy, company CIK, company SIC, and/or the like. In some cases, processing a single filing package involves processing a set of six (6) or more files. In some cases of iXBRL ("Inline XBRL"), the system may extract the fact information with the html row header from the xhtml file. In some cases of iXBRL, the system may predict the table type. In some cases of traditional XBRL, the system may be provided with the table type as part of the XBRL outline, which is a combination of the schema and label and presentation linkbases. In some cases of traditional XBRL, the system may determine the html row header by matching XBRL outline sections with the html tables. In some cases, the SIC codes are taken from the source of the document (e.g., SEC) and not part of the filing. In some cases, the SIC codes are grouped into a small set of industry groups/categories.

According to certain embodiments, the XBRL tag outlier detection system 110 and/or the machine learning processor 130 analyzes the XBRL document and the one or more assigned XBRL tags using the selected trained machine learning model. In some embodiments, the XBRL tag outlier detection system 110 and/or the machine learning processor 130 identifies a set of outlier XBRL tags in the one or more assigned XBRL tags using the selected machine learning model. In certain embodiments, the system predicts whether the one or more XBRL tags for each tagging section is an outlier or an inlier. FIG. 4 is one illustrative example of an XBRL document with one or more assigned XBRL tags. In some embodiments, in the XBRL document, at least a part or all of the one or more assigned XBRL tags each is associated with a corresponding document location and corresponding filing information. In certain embodiments, the document location includes one or more of a root abstract of the XBRL outline, a section location of the XBRL outline. In some embodiments, the XBRL tag outlier detection system is configured to identify outlier tags by inputting the XBRL document, the one or more assigned XBRL tags and/or corresponding document location and corresponding filing information to the selected trained machine learning model.

In some embodiments, the interface engine 140 is configured to interface with other systems or devices 160. In some embodiments, the interface engine 140 is configured to connect to an electronic filing system or a finance system 160 via a software interface. In some cases, the interface engine 140 is configured to use a set of predetermined protocols through the software interface. In some cases, the software interface comprises of at least one application programming interface and a web service interface.

Figure 5:
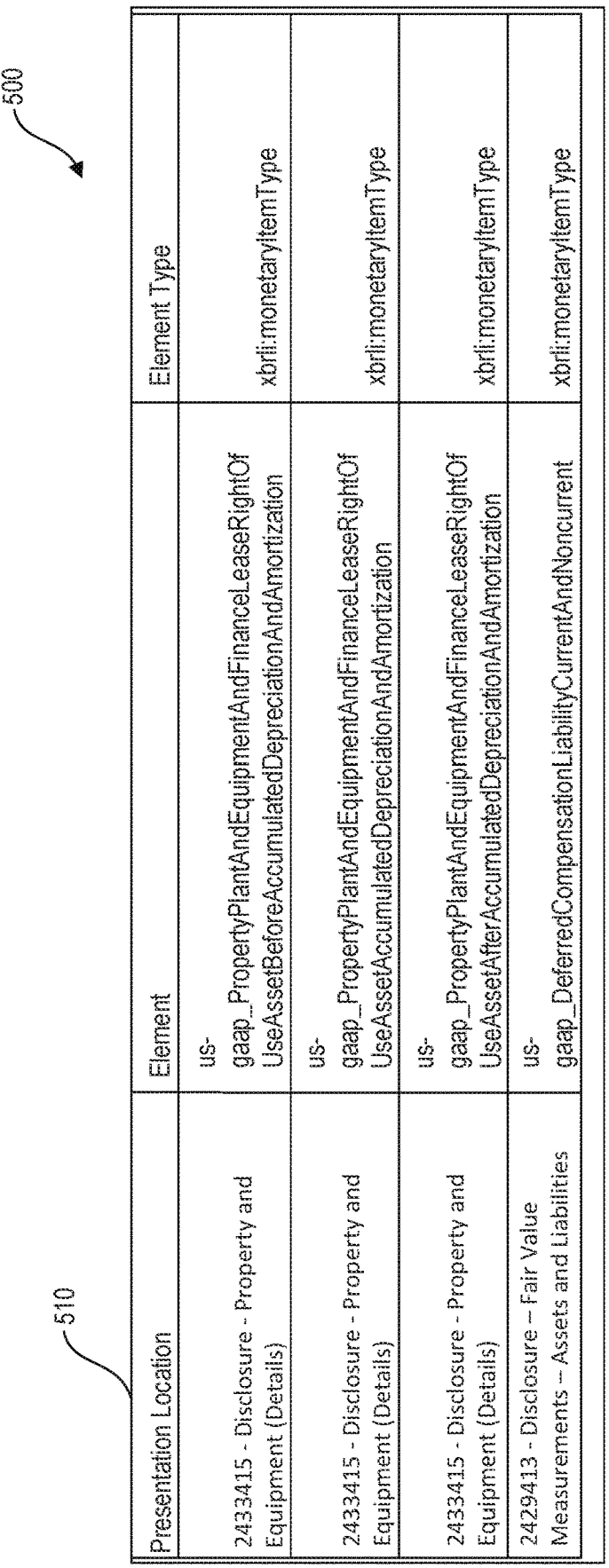
FIG. 5 shows an example of an XBRL outlier output.

According to some embodiments, the XBRL tag outlier detection system 110 and/or the output engine 145 generate an output including the set of outlier XBRL tags and corresponding document locations. As an example, illustrated in FIG. 4, the document location is indicated as an XBRL outline location (e.g., a presentation location, a presentation section outline location). One example of the XBRL outlier output 500 is shown in FIG. 5, which includes presentation locations 510 (e.g., "Property and Equipment (Details)", "Disclosure—Fair Value Measurements—Assets and Liability"). In some examples, the outlier XBRL tag includes the tag element. In certain examples, the outlier XBRL tag includes the tag element type.

According to certain embodiments, the XBRL tag outlier detection system 110 and/or the output engine 145 transmits the output to a user device and/or a filing system 160, for example, via a software interface). In some embodiments, transmitting a data package includes transmitting the data package via a communication protocol over a communication interface. In certain embodiments, transmitting a data package includes storing the data package in a data repository for another software component to retrieve. In some embodiments, transmitting a data package includes passing the data package to another software component via a software interface. In certain embodiments, the output can be presented to a user interface via the output engine 145 or a user device 160. In some embodiments, the output can be retrieved from a link via a user device 160. In certain embodiments, the output includes a file, for example, a CSV (comma-separated values) file, spreadsheet, or the like.

In some embodiments, the XBRL data repository 150 can include taxonomy data, filing packages, XBRL documents, outlier XBRL tags, selected XBRL tags, documents (including XBRL documents) received for analysis, and/or the like. The XBRL data repository 150 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the system 100 can execute software or firmware stored in non-transitory computer-readable medium to implement various processing steps. Various components and processors of the system 100 can be implemented by one or more computing devices, including but not limited to, circuits, a computer, a cloud-based processing unit, a processor, a processing unit, a microprocessor, a mobile computing device, and/or a tablet computer. In some cases, various components in the XBRL tag outlier detection environment 100 (e.g., the document processor 120, the machine learning processor 130, the interface engine 140, the output engine 145, the one or more user devices 160) can be implemented on a shared computing device. Alternatively, a component in the XBRL tag outlier detection environment 100 can be implemented on multiple computing devices. In some implementations, various modules and components in the XBRL tag outlier detection environment 100 can be implemented as software, hardware, firmware, or a combination thereof. In some cases, various components in the XBRL tag outlier detection environment 100 can be implemented in software or firmware executed by a computing device.

Various components in the XBRL tag outlier detection environment 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocols. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
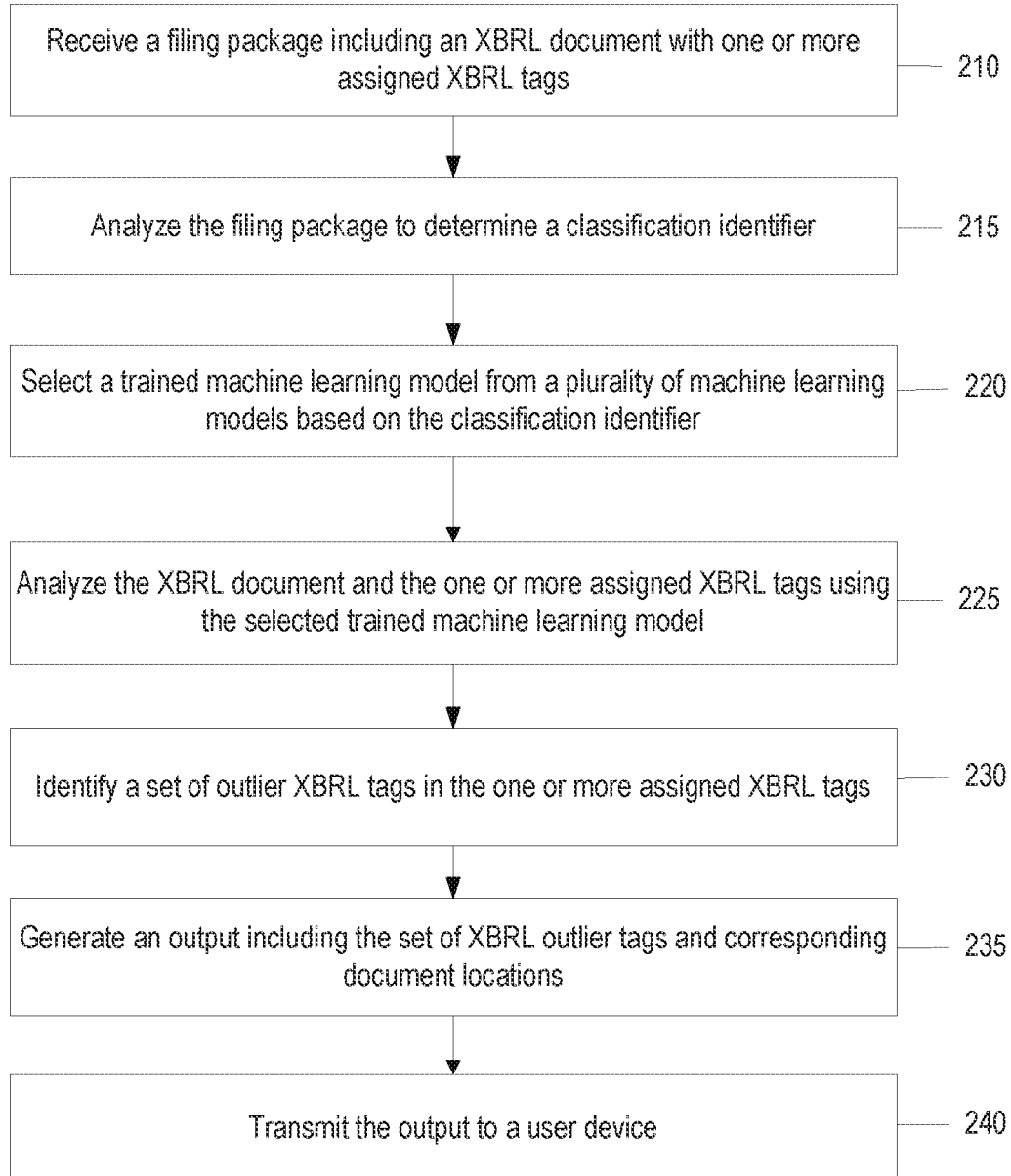
FIG. 2 is a simplified diagram showing a method for XBRL tag outlier detection, in accordance with certain embodiments of the present disclosure.

FIG. 2 is a simplified diagram showing a method 200 for XBRL tag outlier detection, in accordance with certain embodiments of the present disclosure. This diagram is merely an example. One of ordinary skill in the art would recognize many variations, alternatives, and modifications. The method 200 for designing an application with action logs includes processes 210, 215, 220, 225, 230, 235, and 240. Although the above has been shown using a selected group of processes for the method 200 for designing an application with action logs, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

Aspects of embodiments of the method 200 may be performed, for example, by components of an XBRL tag outlier detection system (e.g., components of the XBRL tag outlier detection system 100 of FIG. 1). According to some embodiments, at process 210, the XBRL tag outlier detection system receives a filing package including an XBRL document with one or more assigned XBRL tags. In certain embodiments, the document can be a business document, a reporting document, a compliance document, and/or the like. In some cases, the system can receive the document via interfacing with other systems. In some cases, the system can receive the document via retrieving the document via a data repository (e.g., the XBRL data repository 150 in FIG. 1). In some embodiments, the XBRL tag outlier detection system is coupled to an electronic filing system via a software interface to receive the document. In some embodiments, the system is configured to use a set of predetermined protocols through the software interface. In certain embodiments, the software interface comprises an application programming interface and/or a web service interface.

In some embodiments, the filing package includes an XBRL outline, also referred to as a presentation section outline, along with the XBRL document. One example of an XBRL outline is illustrated in FIG. 4. In certain embodiments, the XBRL tag outlier detection system generates or extracts the XBRL outline based on the filing package and/or the XBRL document. According to certain embodiments, at process 215, the XBRL tag outlier detection system is configured to analyze the filing package and/or the XBRL document to determine a classification identifier. In some embodiments, the classification identifier can be an identifier of the filer associated with the filing package, the filer CIK ("Central Index Key"), the filer SIC, a SIC group, a CIK group, and/or the like.

According to some embodiments, at process 220, the XBRL tag outlier detection system selects a trained machine learning model from a plurality of machine learning models based at least in part on the classification identifier. In some embodiments, the system is configured to select a first machine learning model based on a first classification identifier and select a second machine learning model based on a second classification identifier different from the first classification identifier, where the second machine learning model is different from the first machine learning model. In certain examples, the system is configured to select a first machine learning model based on a first CIK and select a second machine learning model based on a second CIK different from the first CIK, where the second machine learning model is different from the first machine learning model. In some examples, the system is configured to select a first machine learning model based on a first SIC and select a second machine learning model based on a second SIC different from the first SIC, where the second machine learning model is different from the first machine learning model.

In some embodiments, the system identifies tagging sections in the document, for example, based on the XBRL outline. In one embodiment, the tagging sections are identified based on a known document format. In one embodiment, the system can extract and aggregate from the tagging sections potentially relevant XBRL metadata, tags, and relationships including, for example, tagged concept, concept value, numeric scale, units of measure, unit numerators, unit denominators, row headers, column headers, document type, filer category; sibling and parent tags, accession number, filing date, XBRL taxonomy, company CIK, company SIC, and/or the like. In some cases, processing a single filing package involves processing a set of six (6) or more files. In some cases of iXBRL ("Inline XBRL"), the system may extract the fact information with the html row header from the xhtml file. In some cases of iXBRL, the system may predict the table type based at least in part on the document (e.g., the html row header). In some cases of traditional XBRL, the system may be provided with the table type as part of the XBRL outline, which is a combination of the schema and label and presentation linkbases. In some cases of traditional XBRL, the system may determine the html row header by matching XBRL outline sections with the html tables. In some cases, the SIC codes are taken from the source of the document (e.g., SEC) and not part of the filing. In some cases, the SIC codes are grouped into a small set of industry groups/categories.

According to certain embodiments, at process 225, the XBRL tag outlier detection system analyzes the XBRL document and the one or more assigned XBRL tags using the selected trained machine learning model. In some embodiments, at process 230, the XBRL tag outlier detection system identifies a set of outlier XBRL tags in the one or more assigned XBRL tags using the selected machine learning model. In certain embodiments, the system predicts one or more XBRL tags for each tagging section. FIG. 4 is one illustrative example of an XBRL document with one or more assigned XBRL tags. In some embodiments, in the XBRL document, at least a part or all of the one or more assigned XBRL tags each is associated with a corresponding document location and the corresponding filing information. In certain embodiments, the document location includes one or more of a root abstract of the XBRL outline, and a section location of the XBRL outline. In some embodiments, the XBRL tag outlier detection system is configured to identify outlier tags by inputting the XBRL document, the one or more assigned XBRL tags and/or corresponding document location and corresponding filing information to the selected trained machine learning model.

According to some embodiments, at process 235, the XBRL tag outlier detection system generates an output including the set of outlier XBRL tags and corresponding document locations. As an example, illustrated in FIG. 4, the document location is indicated as an XBRL outline location (e.g., a presentation location, a presentation section outline location). One example of the XBRL outlier output 500 is shown in FIG. 5, which includes presentation locations 510 (e.g., "Property and Equipment (Details)", "Disclosure—Fair Value Measurements—Assets and Liability"). In some examples, the outlier XBRL tag includes the tag element. In certain examples, the outlier XBRL tag includes the tag element type.

According to certain embodiments, at process 240, the XBRL tag outlier detection system transmits the output to a user device and/or a filing system, for example, via a software interface). In some embodiments, transmitting a data package includes transmitting the data package via a communication protocol over a communication interface. In certain embodiments, transmitting a data package includes storing the data package in a data repository for another software component to retrieve. In some embodiments, transmitting a data package includes passing the data package to another software component via a software interface. In certain embodiments, transmitting a data package includes a combination of the above steps.

Figure 3:
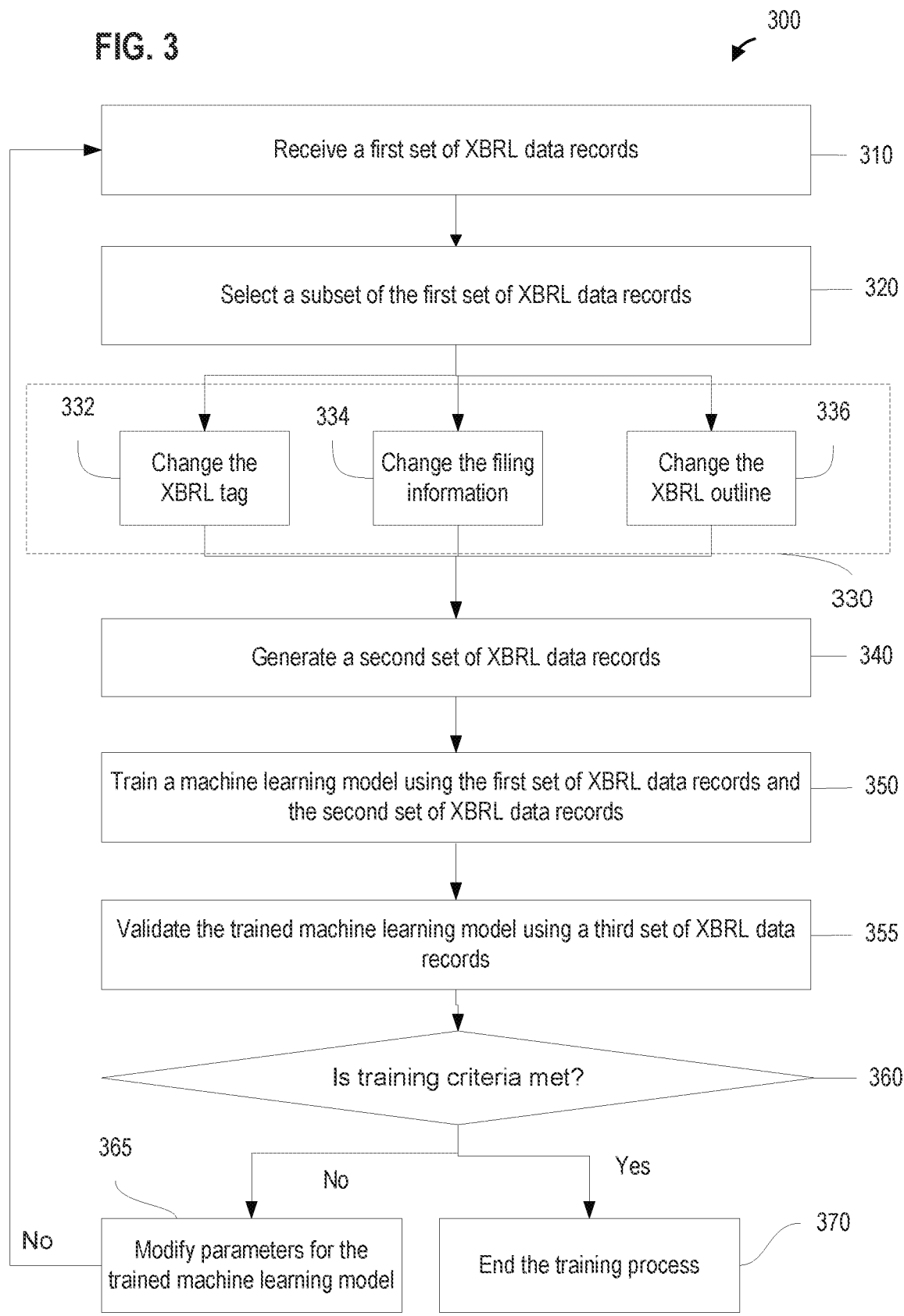
FIG. 3 is a simplified diagram showing a method for training machine learning models for XBRL tag outlier detection, in accordance with certain embodiments of the present disclosure.

FIG. 3 is a simplified diagram showing a method 300 for training machine learning models for XBRL tag outlier detection, in accordance with certain embodiments of the present disclosure. This diagram is merely an example. One of ordinary skill in the art would recognize many variations, alternatives, and modifications. The method 300 for designing an application with action logs includes processes 310, 320, 332, 334, 336, 340, and 350. Although the above has been shown using a selected group of processes for the method 300 for designing an application with action logs, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

Aspects of embodiments of the method 300 may be performed, for example, by components of an XBRL tag outlier detection system (e.g., components of the XBRL tag outlier detection system 110 of FIG. 1). According to some embodiments, at process 310, the XBRL tag outlier detection system receives a first set of XBRL data records. In certain embodiments, each XBRL data record in the first set of XBRL data records includes one or more XBRL tags and at least one selected from a group consisting of, a classification identifier, a root abstract, and an XBRL outline. In some embodiments, each XBRL data record in the first set of XBRL data records include one or more XBRL tags, a classification identifier, a root abstract, and/or an XBRL outline. In certain examples, at least a part of the first set of XBRL data records include one or more XBRL tags (e.g., XBRL concepts). FIG. 4 illustrates one example of an XBRL package 400 including an XBRL outline 410, a selected XBRL section location 420, a root abstract 430, and filing information 440. In some examples, the classification identifier includes the filer CIK, the filer SIC, a CIK group identifier, a SIC group identifier, an industry sector identifier, a filer identifier, and/or the like. In certain embodiments, the classification identifier is extracted from the filing information. In some embodiments, the XBRL outline is extracted from a filing package and stored with the XBRL data record.

According to certain embodiments, at process 320, the XBRL tag outlier detection system selects a subset of the first set of XBRL data records. In some embodiments, the subset of the first set of XBRL data records is selected based upon one or more criteria. In certain embodiments, the subset of the first set of XBRL data records is selected based upon one or more predetermined criteria. In some embodiments, the subset of the first set of XBRL data records is selected based upon one or more criteria that are dynamically changed, for example, during the training process. In certain embodiments, the subset of the first set of XBRL data records is randomly selected.

According to some embodiments, at process 330, the XBRL tag outlier detection system is configured to change at least a part of or all of the subset of the first set of XBRL data records. In certain embodiments, at process 332, the system is configured to change the XBRL tag in a data record in the subset of the first set of XBRL data records. In some embodiments, at process 334, the system is configured to change the filing information in a data record in the subset of the first set of XBRL data records. In certain embodiments, at process 336, the system is configured to change the XBRL outline in a data record in the subset of the first set of XBRL data records.

According to certain embodiments, at process 340, the XBRL tag outlier detection system is configured to generate a second set of XBRL data records based on the modified data records in the subset of the first set of data records. In some embodiments, the system modifies a first XBRL tag in a first record in the subset of the first set of XBRL data records to generate a second record in the second set of XBRL data records, where the first record includes first filing information and the first XBRL tag, the second record includes a second XBRL tag and the first filing information, and the second XBRL tag is the modified first XBRL tag. In certain embodiments, the second XBRL tag is an outlier tag based at least upon a taxonomy and the first filing information. In some embodiments, the taxonomy is determined or selected based at least in part upon the classification identifier.

In certain embodiments, the system modifies third filing information in a third record in the subset of the first set of XBRL data records to generate a fourth record in the second set of XBRL data records, where the third record includes a third XBRL tag and the third filing information, the fourth record includes a fourth XBRL tag and fourth filing information, the fourth XBRL tag is the same as the third XBRL tag, and the fourth filing information is the modified third filing information. In some embodiments, the fourth XBRL tag is an outlier tag based at least upon a taxonomy and the fourth filing information.

In certain embodiments, the system modifies a fifth XBRL outline in a fifth record in the subset of the first set of XBRL data records to generate a sixth record in the second set of XBRL data records, where the fifth record includes a fifth XBRL tag and fifth filing information, the fifth filing information includes the fifth XBRL outline, the sixth record includes a sixth XBRL tag and sixth filing information, the sixth XBRL tag is the same as the fifth XBRL tag, and the sixth filing information includes the modified fifth XBRL outline. In some embodiments, the sixth XBRL tag is an outlier tag based at least upon a taxonomy and the sixth filing information.

According to some embodiments, at process 350, the XBRL tag outlier detection system is configured to train a machine learning model using the first set of the XBRL data records and the second set of the XBRL data records. The machine learning model may include any suitable machine learning models, deep learning models, and/or the like. In certain embodiments, the machine learning model includes a meta-classifier. In some embodiments, the machine learning model includes at least one of a decision tree, random forest, support vector machine, convolutional neural network, recurrent neural network, gradient boosted tree (e.g., XGBoost) and/or the like. In certain embodiments, the system is configured to train different machine learning models using different sets of XBRL data records.

According to certain embodiments, at process 355, the XBRL tag outlier detection system is configured to validate the trained machine learning model using a third set of XBRL data records. In some embodiments, the third set of XBRL data records and the first set of the XBRL data records do not have any overlapping data records. In another embodiment, the third set of XBRL data records and the first set of the XBRL data records have at least one overlapping data record.

According to some embodiments, at process 360, the XBRL tag outlier detection system is configured to check whether the training criteria is met. In certain embodiments, the training criteria includes a loss function to calculate the efficacy of the trained machine model. In some embodiments, the training criterion is related to repeated failure to reduce loss on the validation subset (e.g., the third set of XBRL data records). For example, the training criterion is when the training fails to improve the efficacy of the machine learning model by a predetermined number of epochs. In some embodiments, the training criterion is related to the efficacy of the machine learning model equal to or higher than a predetermined threshold (e.g., 95%). In certain embodiments, if the training criterion is not met, at process 365, the XBRL tag outlier detection system is configured to modify one or more parameters for the trained machine learning model, and go back to the training process 310. In some embodiments, if the training criterion is met, at process 370, the training process is ended.

In some embodiments, the system is configured to train different machine learning models with different classification identifiers using different sets of XBRL data records. In certain embodiments, the system is configured to select a first XBRL dataset based upon a first classification identifier, modify a subset of first XBRL dataset, and train a first machine learning model using the first XBRL dataset. In some embodiments, the system is configured to select a second XBRL dataset based upon a second classification identifier, modify a subset of the second XBRL dataset, and train a second machine learning model using the second XBRL dataset including the modified subset, where the second machine learning model is different from the first machine learning model.

Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method implemented by a computer system having one or more processors and one or more memories, comprising:
   receiving a first set of XBRL data records;
   generating a second set of XBRL data records based upon a subset of the first set of XBRL data records by at least modifying the subset of the first set of XBRL data records with a modification, the modification to the subset of the first set of XBRL data records including at least one selected from a group consisting of a modification to an XBRL tag in the first set of XBRL data records, a modification to filing information associated with the first set of XBRL data records, and a modification to an XBRL outline associated with the first set of XBRL data records;
   training a machine learning model using the first set of XBRL data records and the second set of XBRL data records;

receiving an XBRL document associated with one or more assigned XBRL tags; and
analyzing the XBRL document using the trained machine learning model to identify a set of outlier XBRL tags in the one or more assigned XBRL tags, each outlier XBRL tag in the set of identified outlier XBRL tags being an uncommon tag for corresponding filing information.

2. The method of claim 1, wherein the generating a second set of XBRL data records based upon a subset of the first set of XBRL data records further comprises:
modifying a first XBRL tag in a first record in the subset of the first set of XBRL data records to generate a second record in the second set of XBRL data records, the first record including first filing information, the second record including a second XBRL tag and the first filing information, the second XBRL tag being the modified first XBRL tag;
wherein the second XBRL tag is an outlier tag based at least upon a taxonomy and the first filing information.

3. The method of claim 1, wherein the generating a second set of XBRL data records based upon a subset of the first set of XBRL data records further comprises:
modifying third filing information in a third record in the subset of the first set of XBRL data records to generate a fourth record in the second set of XBRL data records, the third record including a third XBRL tag and the third filing information, the fourth record including a fourth XBRL tag and fourth filing information, the fourth XBRL tag being same as the third XBRL tag, the fourth filing information being the modified third filing information;
wherein the fourth XBRL tag is an outlier tag based at least upon a taxonomy and the fourth filing information.

4. The method of claim 1, wherein each XBRL data record in the first set of XBRL data records includes one or more XBRL tags and at least one selected from a group consisting of a classification identifier, a root abstract, and an XBRL outline.

5. The method of claim 4, wherein the generating a second set of XBRL data records based upon a subset of the first set of XBRL data records further comprises:
modifying a fifth XBRL outline in a fifth record in the subset of the first set of XBRL data records to generate a sixth record in the second set of XBRL data records, the fifth record including a fifth XBRL tag and fifth filing information, the fifth filing information including the fifth XBRL outline, the sixth record including a sixth XBRL tag and sixth filing information, the sixth XBRL tag being same as the fifth XBRL tag, the sixth filing information including the modified fifth XBRL outline;
wherein the sixth XBRL tag is an outlier tag based at least upon a taxonomy and the sixth filing information.

6. The method of claim 1, further comprising:
generating an output including the set of identified outlier XBRL tags in the one or more assigned XBRL tags.

7. The method of claim 6, wherein the output includes an indication of a document location for each outlier XBRL tag in the set of identified outlier XBRL tags.

8. The method of claim 7, wherein the document location includes an XBRL outline location for each outlier XBRL tag in the set of identified outlier XBRL tags.

9. The method of claim 6, wherein the output includes a file.

10. The method of claim 1, wherein the trained machine learning model includes a meta-classifier.

11. The method of claim 1, wherein the trained machine learning model is selected based at least in part upon a classification identifier.

12. A method implemented by a computer system having one or more processors and one or more memories, comprising:
receiving a filing package including an XBRL document with one or more assigned XBRL tags;
analyzing the filing package to determine a classification identifier;
selecting a trained machine learning model from a plurality of machine learning models based on the classification identifier, wherein the selected trained machine learning model is trained using a first set of XBRL data records and a second set of XBRL data records, wherein the second set of XBRL data records is generated based at least in part on a modification to a subset of the first set of XBRL data records, the modification to the subset of the first set of XBRL data records including at least one selected from a group consisting of a modification to an XBRL tag in the first set of XBRL data records, a modification to filing information associated with the first set of XBRL data records, and a modification to an XBRL outline associated with the first set of XBRL data records;
analyzing the XBRL document and the one or more assigned XBRL tags using the selected trained machine learning model;
identifying a set of outlier XBRL tags in the one or more assigned XBRL tags, each outlier XBRL tag in the set of identified outlier XBRL tags being an uncommon tag for corresponding filing information in the filing package.

13. The method of claim 12, further comprising:
generating an output including the set of identified outlier XBRL tags in the one or more assigned XBRL tags.

14. The method of claim 13, wherein the output includes an indication of a document location for each outlier XBRL tag in the set of identified outlier XBRL tags.

15. The method of claim 14, wherein the document location includes an XBRL outline location for each outlier XBRL tag in the set of identified outlier XBRL tags.

16. The method of claim 13, wherein the output includes a file.

17. The method of claim 12, wherein the generating a second set of XBRL data records based upon a subset of the first set of XBRL data records further comprises:
modifying a first XBRL tag in a first record in the subset of the first set of XBRL data records to generate a second record in the second set of XBRL data records, the first record including first filing information, the second record including a second XBRL tag and the first filing information, the second XBRL tag being the modified first XBRL tag;
wherein the second XBRL tag is an outlier tag based at least upon a taxonomy and the first filing information.

18. The method of claim 12, wherein the generating a second set of XBRL data records based upon a subset of the first set of XBRL data records further comprises:
modifying third filing information in a third record in the subset of the first set of XBRL data records to generate a fourth record in the second set of XBRL data records, the third record including a third XBRL tag and the third filing information, the fourth record including a fourth XBRL tag and fourth filing information, the fourth XBRL tag being same as the third XBRL tag, the fourth filing information being the modified third filing information;

wherein the fourth XBRL tag is an outlier tag based at least upon a taxonomy and the fourth filing information.

19. The method of claim 12, wherein each XBRL data record in the first set of XBRL data records includes one or more XBRL tags and at least one selected from a group consisting of a classification identifier, a root abstract, and an XBRL outline.

20. The method of claim 19, wherein the generating a second set of XBRL data records based upon a subset of the first set of XBRL data records further comprises:

modifying a fifth XBRL outline in a fifth record in the subset of the first set of XBRL data records to generate a sixth record in the second set of XBRL data records, the fifth record including a fifth XBRL tag and fifth filing information, the fifth filing information including the fifth XBRL outline, the sixth record including a sixth XBRL tag and sixth filing information, the sixth XBRL tag being same as the fifth XBRL tag, the sixth filing information including the modified fifth XBRL outline;

wherein the sixth XBRL tag is an outlier tag based at least upon a taxonomy and the sixth filing information.

21. The method of claim 12, wherein the selected trained machine learning model includes a meta-classifier.

* * * * *